(No Model.) 2 Sheets—Sheet 1.
A. SCHEITHAUER.
MACHINE FOR CUTTING MEAT OR OTHER SUBSTANCES.
No. 513,342. Patented Jan. 23, 1894.
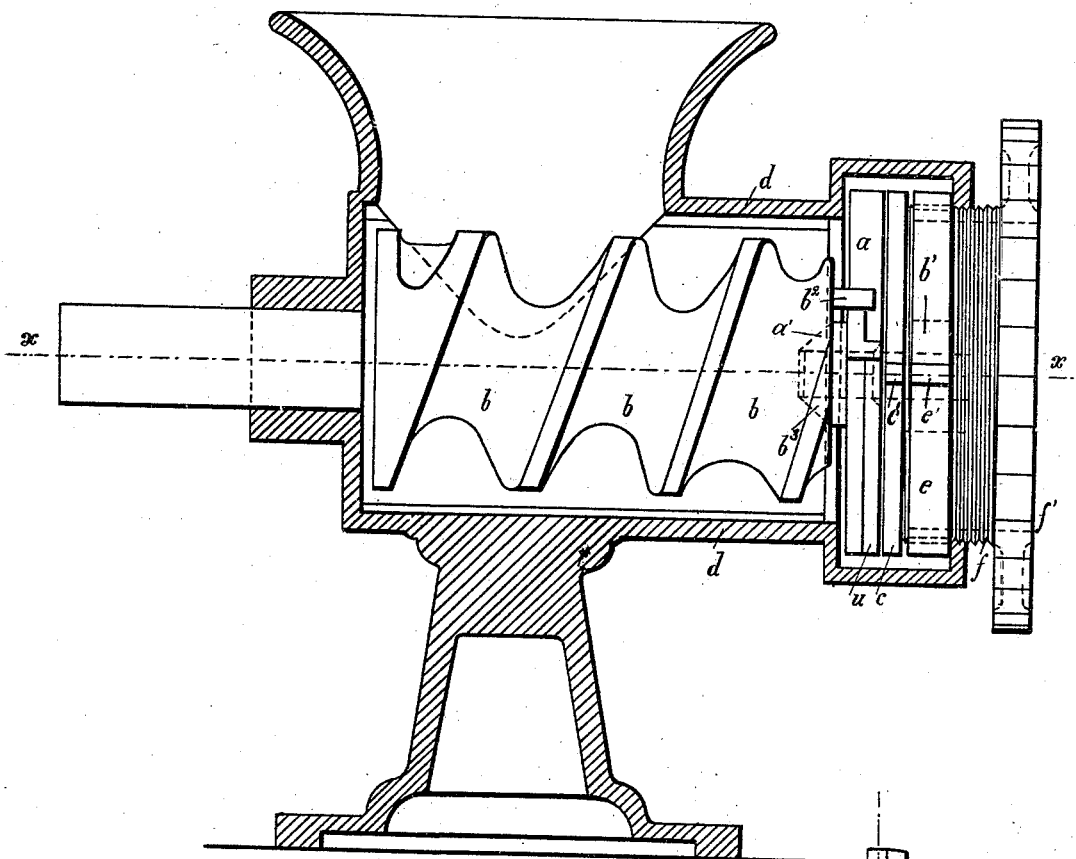
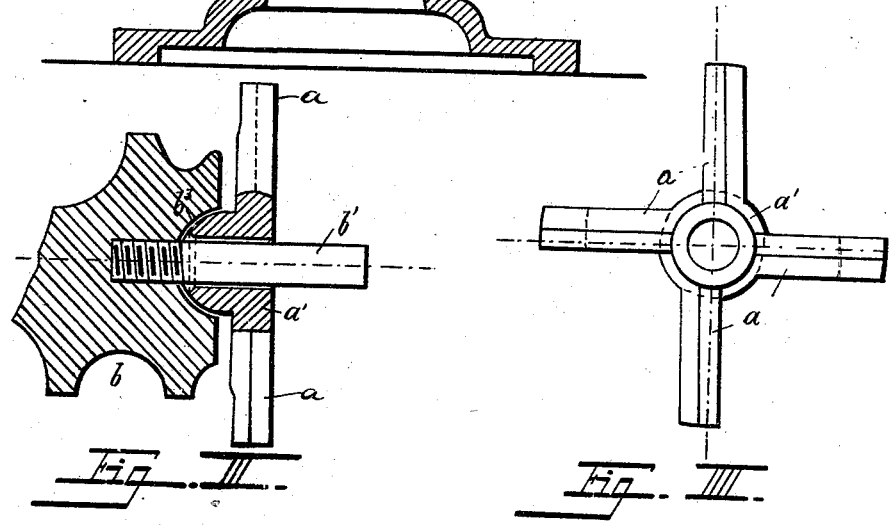
Witnesses:
E. M. Clark
C. Sedgwick
Inventor
A. Scheithauer
by
Attorneys (No Model.) 2 Sheets—Sheet 2.
A. SCHEITHAUER.
MACHINE FOR CUTTING MEAT OR OTHER SUBSTANCES.
No. 513,342. Patented Jan. 23, 1894.
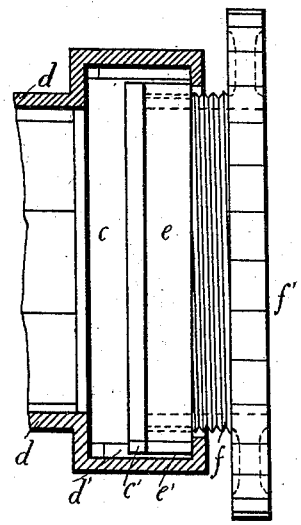
Fig. II.
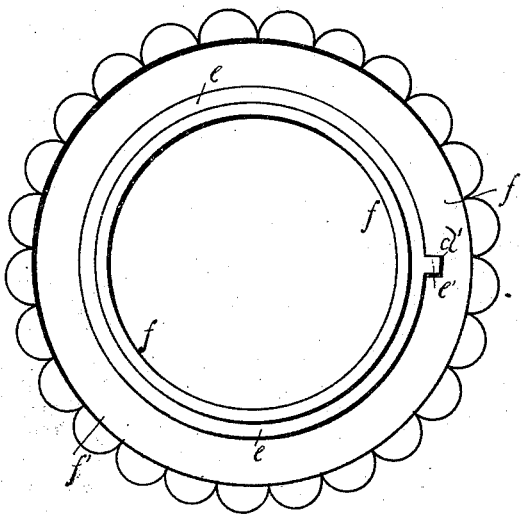
Fig. IV.
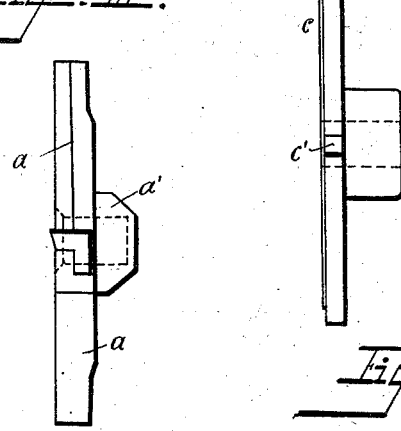
Fig. III.
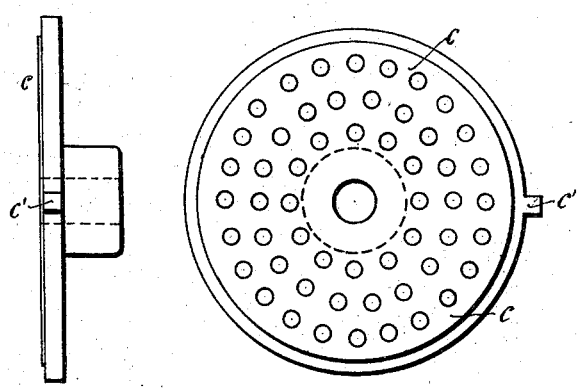
Fig. V. Fig. V<sup>a</sup>.
Witnesses:
E. M. Clark
C. Sedgwick
Inventor
A. Scheithauer
by
Attorneys

United States Patent Office.

ARNOLD SCHEITHAUER, OF BERLIN, GERMANY.

MACHINE FOR CUTTING MEAT OR OTHER SUBSTANCES.

SPECIFICATION forming part of Letters Patent No. 513,342, dated January 23, 1894.

Application filed June 11, 1892. Serial No. 436,315. (No model.) Patented in England May 18, 1892, No. 9,475, and in Austria-Hungary October 11, 1892, No. 25,412 and No. 43,947.

*To all whom it may concern:*

Be it known that I, ARNOLD SCHEITHAUER, of Berlin, in the Kingdom of Prussia and German Empire, have invented a new and useful Machine for Cutting Meat or other Substances, (for which I have obtained Letters Patent in England May 18, 1892, No. 9,475, and in Austria-Hungary October 11, 1892, Nos. 25,412 and 43,947,) of which the following is a specification, reference being had therein to the accompanying drawings.

This invention relates to mincing machines, in which the material to be disintegrated, for instance meat, is fed along in a casing by means of a worm or spiral, and pressed through a perforated disk, a knife (generally cross-shaped, and taking part in the movement of the worm) sliding round the inner surface of the perforated disk and cutting off the meat pressed into the holes of the perforated disk by the worm. These machines have the disadvantage that the feeding of the meat and the consequent pressing of the same against the perforated plate are not effected evenly at all parts. In consequence of this the perforated disk, held by a screwed cap, becomes soon loosened by the giving way of the latter, whereby the disk gets into an oblique position and is no longer touched at all points by the blades of the cross-shaped knife. The result is that particles of meat get between the blades and the perforated disk, whereby the regular working of the machine is affected and the blades are sometimes broken or damaged.

The object of this invention is to provide an improved arrangement by means of which the cross-shaped knife is always pressed evenly against the perforated disk, whether the perforated disk assumes a position oblique to the axis of the feed screw or not. To this end, the boss of the cross-shaped knife is conical, or ball-shaped, and fits into a corresponding recess or socket formed in the worm around the round pin of the latter, on which the cross-shaped knife and the perforated disks are arranged in such a manner as will allow a certain amount of play.

Another object of this invention is to provide a device by means of which the perforated disk is kept in position. This is designed so that it may be removed and easily cleansed, after the casing which is formed in halves, has been opened.

In order that my invention may be the better understood I now proceed to describe the same reference being had to the accompanying drawings, and to the letters marked thereon.

Like letters refer to like parts throughout the views.

Figure 1 is a vertical section through the machine, the interior parts being shown in side elevation. Fig. 2 is a detail plan view of the exit end of the machine, the casing being in section, and the worm and cross-shaped knife being omitted. Fig. 3 is a vertical section through the cross-shaped knife and the adjacent part of the worm. Fig. $3^a$ is an edge view of the knife. Fig. 4 is an elevation or face view of the knife or cutter. Fig. 5 is an edge view of the perforated disk. Fig. $5^a$ is a face view of such disk, and Fig. 6 shows one view of the threaded closing device.

As shown in Figs. 3 and 4, the boss $a'$, of the cross-shaped knife $a$ is ball-shaped at its free end, while the worm $b$, has a corresponding recess $b^3$, around the pin $b'$. By this means when the knife $a$ (after having been placed on the pin, so as to have a little play thereon and has been pushed against the worm) can assume to a certain degree an oblique position as regards the axis of the worm. The knife $a$ receives the necessary rotary movement by the pin $b^2$ arranged on the end of the worm which projects toward the cross-shaped knife $a$ and acts against an arm of the latter.

Beside the knife $a$ there is arranged on the pin $b'$ the perforated disk $c$, provided at its circumference with a projection $c'$, which is received in a recess $d'$, Fig. 2, of the casing $d$, and serves to prevent any rotary movement of the perforated disk $c$.

In practice, the casing is divided centrally and longitudinally, on line $x\,x$, and thus made in two parts to facilitate insertion and removal of the interior working parts; but such construction being a common and well known feature of mincing machines and various others of allied character, I have not deemed it necessary to illustrate it in the drawings.

While in machines of the old type the nut required for the fixing of the perforated disk was screwed to the screw-threaded end of the casing from the outside, in this machine the perforated disk $c$ is held in position by a threaded ring which can be easily removed from the casing after the latter has been opened. This device consists of a ring $e$, provided with an inner screw-thread, and a hollow ring $f$, having an exterior screw-thread and screwed into the ring $e$. This ring $f$ has at its outer end (shown in Figs. 1 and 2 at the right hand side) a flange $f'$ scalloped or milled at the periphery, (see Fig. 6,) which serves to turn it when screwing it in. Like the perforated disk $c$, the ring $e$ is provided with a projection $e'$, which also is received in the recess $d'$ of the casing $d$, thus preventing a rotation of the ring $e$.

The holding device $e, f$, has the position on the machine shown in Figs. 1 and 2. The flange $f'$ of the hollow piece $f$ is outside the casing so that it may be easily gripped with the hand. After the machine has been put together the hollow piece $f$ is screwed into the ring $e$ so far that the inner flat end of $f$ abuts against the perforated disk $c$ and presses the latter with sufficient force against the cross-shaped knife $a$. If now during the operation of the machine the hollow piece $f$ is unscrewed to some extent from the ring $e$ accidentally, and the perforated disk $c$ becomes loose, the blades of the cross-shaped knife $a$ remain nevertheless in contact with the inner face of the perforated disk $c$, because the pressure of the meat fed forward by the worm compels the knife $a$ to rock on its ball joint as much as is necessary to keep the blades at all points in touch with the perforated disk $c$.

As before mentioned this machine may also be used for mincing substances other than meat.

I claim—

1. In a machine for cutting meat and other substances, the combination with the case, feed shaft and knives, of a perforated plate, and a clamp device consisting of the internally-threaded ring, $e$, adapted to slide in said case, and the exteriorly-threaded ring, $f$, fitting in part, $e$, and having a radially-projecting flange, substantially as described.

2. In a machine for cutting meat &c., the combination, with the feeding-shaft, or screw, having a socket and pin at one end, of the knife having a conical boss which fits in said socket, and mounted loosely on said pin, whereby it is adapted for a certain "play," as and for the purpose specified.

3. In a machine for cutting meats and other substances, the combination, with a case having an internal longitudinal slot, of a feed shaft or screw therein, knives rotating with the shaft, a perforated disk arranged in connection with said knives and having a projection entering the slot of the case, a ring in the case having a projection entering said slot, and a threaded clamping ring engaging the first mentioned ring, substantially as described.

In witness whereof I have hereunto set my hand in presence of two witnesses.

ARNOLD SCHEITHAUER.

Witnesses:
PAUL FISCHER,
PAUL BRINKMANN.